United States Patent
Matsumoto (10) Patent No.: US 7,088,018 B2
(45) Date of Patent: Aug. 8, 2006

(54) ELECTROMAGNETIC DRIVE TYPE ACTUATOR

(75) Inventor: Kazuya Matsumoto, Kamiina-gun (JP)

(73) Assignee: Olympus Corporation, Tokyo (JP)

(*) Notice: Subject to any disclaimer, the term of this patent is extended or adjusted under 35 U.S.C. 154(b) by 183 days.

(21) Appl. No.: 10/791,443

(22) Filed: Mar. 2, 2004

(65) Prior Publication Data

US 2004/0195920 A1 Oct. 7, 2004

(30) Foreign Application Priority Data

Apr. 3, 2003 (JP) .............................. 2003-100435

(51) Int. Cl.
*H02K 41/00* (2006.01)
(52) U.S. Cl. ...................................................... 310/12
(58) Field of Classification Search .............. 200/16 R, 200/16 A, 16 B, 16 C, 16 D; 359/223, 224; 310/12; 355/53, 72
See application file for complete search history.

(56) References Cited

U.S. PATENT DOCUMENTS 6,635,837 B1* 10/2003 Subramanian et al. ...... 200/181

6,882,455 B1* 4/2005 Arima ........................ 359/224

FOREIGN PATENT DOCUMENTS

| JP | 5-48957 | 2/1993 |
|----|---------|--------|
| JP | 2001-42233 | 2/2001 |

* cited by examiner

*Primary Examiner*—Karl Tamai
*Assistant Examiner*—Judson H. Jones
(74) *Attorney, Agent, or Firm*—Scully, Scott, Murphy & Presser, P.C.

(57) ABSTRACT

An electromagnetic drive type actuator comprises a movable plate having a flat surface, a support positioned around the movable plate, an elastic member connecting the movable plate with the support, wirings extending through the support, the movable plate, and the elastic member, and a magnetic field generator. The elastic member is elastically deformable and supports the movable plate so as to allow the movable plate to move in directions orthogonal to the flat surface of the movable plate. The wirings pass currents. The magnetic field generator generates a magnetic field in a space around the movable plate. The magnetic field has a direction parallel to the flat surface of the movable plate. The movable plate is moved in the directions orthogonal to the flat surface of the movable plate by a mutual effect between the currents flowing through the wirings and the magnetic field generated by magnetic field generator.

24 Claims, 10 Drawing Sheets

ELECTROMAGNETIC DRIVE TYPE ACTUATOR

CROSS-REFERENCE TO RELATED APPLICATIONS

This application is based upon and claims the benefit of priority from prior Japanese Patent Application No. 2003-100435, filed Apr. 3, 2003, the entire contents of which are incorporated herein by reference.

BACKGROUND OF THE INVENTION

1. Field of the Invention

The present invention relates to an actuator having a movable plate allowed to move, and more particularly to an actuator that displaces a movable plate in directions vertical to a flat surface of the movable plate.

2. Description of the Related Art

Jpn. Pat. Appln. KOKAI Publication No. 2001-42233 discloses an actuator, which displaces a movable plate in directions vertical to a flat surface of the movable plate by using electrostatic driving. A structure of this actuator will now be described hereinafter with reference to FIGS. 17 and 18.

Figure 17:
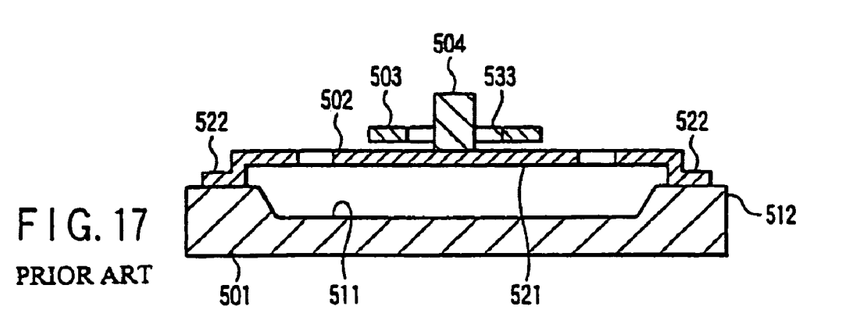
FIG. 17 is a cross-sectional view showing the actuator according to the prior art taken along the line XVII—XVII in FIG. 16.
Figure 18:
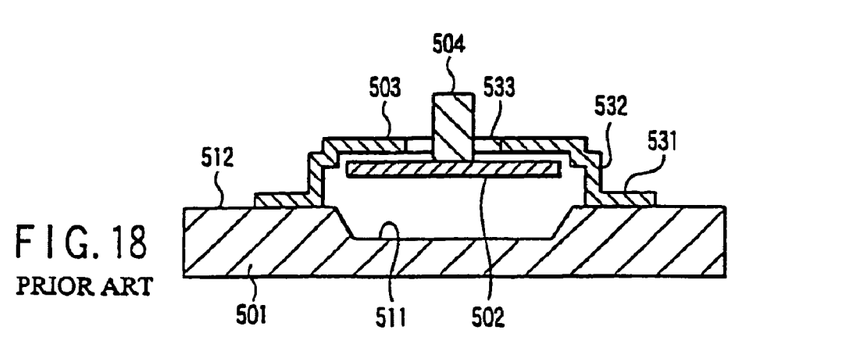
FIG. 18 is a cross-sectional view of the actuator according to the prior art taken along the line XVIII—XVIII in FIG. 16.

As shown in FIGS. 17 and 18, an actuator according to a prior art has a semiconductor silicon substrate 501, a movable electrode plate 502 supported by the semiconductor silicon substrate 501, an upper electrode 503 supported by the semiconductor silicon substrate 501 and positioned above the movable electrode plate 502, and a micro mirror 504 supported by the movable electrode plate 502.

The semiconductor silicon substrate 501 is formed of an n type semiconductor silicon, and constitutes a lower electrode. The semiconductor silicon substrate 501 has a concave portion 511 at its central portion, and a rim of the concave portion 511 constitutes an electrode support frame 512, which supports the movable electrode plate 502 and the upper electrode 503. The concave portion 511 provides a space into which the movable electrode plate 502 moves by suction.

The movable electrode plate 502 is formed by using polysilicon as a material. The movable electrode plate 502 includes a flexure portion 521 and anchor portions 522, both of which are integrally formed, and is fixed to the semiconductor silicon substrate 501 through the anchor portions 522.

The upper electrode 503 is also formed by using polysilicon as a material like the movable electrode plate 502. The upper electrode 503 has upper electrode anchor portions 531 and raised portions 532, both of which are integrally formed, and is fixed to the semiconductor silicon substrate 501 through the upper electrode anchor portions 531. Further, the upper electrode 503 has, at its central portion, a through hole 533, through which the micro mirror 504 is passed.

The micro mirror 504 is erectly fixed on an upper surface of the movable electrode plate 502. A reflection surface of the micro mirror 504 is inclined at, e.g., 45° with respect to an advancing direction of light beams.

In this actuator, a voltage is selectively applied between the movable electrode plate 502 and the upper electrode 503 or between the movable electrode plate 502 and the lower electrode, i.e., the semiconductor silicon substrate 501. The movable electrode plate 502 moves up and down in accordance with such a selective voltage application. As a result, when the micro mirror 504 is inserted into or removed from a light path, a light switch is turned on or off.

Since an electrostatic drive mode is adopted for the above-described electrostatic drive type actuator, a relationship between an applied drive voltage and a displacement quantity of a movable plate (movable electrode plate) has non-linearity.

Furthermore, in the electrostatic drive mode, a sticking state may occur between the movable plate and the fixed electrode portion due to pull-in at the time of a large displacement. The movable plate and the fixed electrode portion must be separated from each other by a distance which is approximately three times of the maximum displacement quantity of the movable plate in a stationary state in order to avoid occurrence of such a sticking state.

BRIEF SUMMARY OF THE INVENTION

The present invention is directed to an electromagnetic drive type actuator, in which a relationship between a displacement quantity and a drive signal has good linearity.

An electromagnetic drive type actuator according to the present invention comprises a movable plate having a flat surface, a support positioned around the movable plate, an elastic member connecting the movable plate with the support, wirings extending through the support, the movable plate, and the elastic member, and a magnetic field generator. The elastic member is elastically deformable and supports the movable plate so as to allow the movable plate to move in directions orthogonal to the flat surface of the movable plate. The wirings pass currents. The magnetic field generator generates a magnetic field in a space around the movable plate. The magnetic field has a direction parallel to the flat surface of the movable plate. The movable plate is moved in the directions orthogonal to the flat surface of the movable plate by a mutual effect between the currents flowing through the wirings and the magnetic field generated by magnetic field generator.

Another electromagnetic drive type actuator according to the present invention comprises a movable plate having a flat surface, a support positioned around the movable plate, an elastic member connecting the movable plate with the support, wirings extending through the support, the movable plate, and the elastic member, and a magnetic field generator. The elastic member is elastically deformable and supports the movable plate so as to allow the movable plate to move in directions orthogonal to the flat surface of the movable plate and directions parallel to the same. The wirings pass currents. The magnetic field generator generates a magnetic field in a space around the movable plate. The magnetic field is one of a first magnetic field having a direction parallel to the flat surface of the movable plate and a second magnetic field having a direction orthogonal to the same. The magnetic field generator selectively generates one of the first magnetic field and second magnetic field. The movable plate is moved in the directions orthogonal to the flat surface of the movable plate or the directions parallel to the same by a mutual effect between the currents flowing through the wirings and the magnetic field generated by the magnetic field generator.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

First Embodiment

Figure 1:
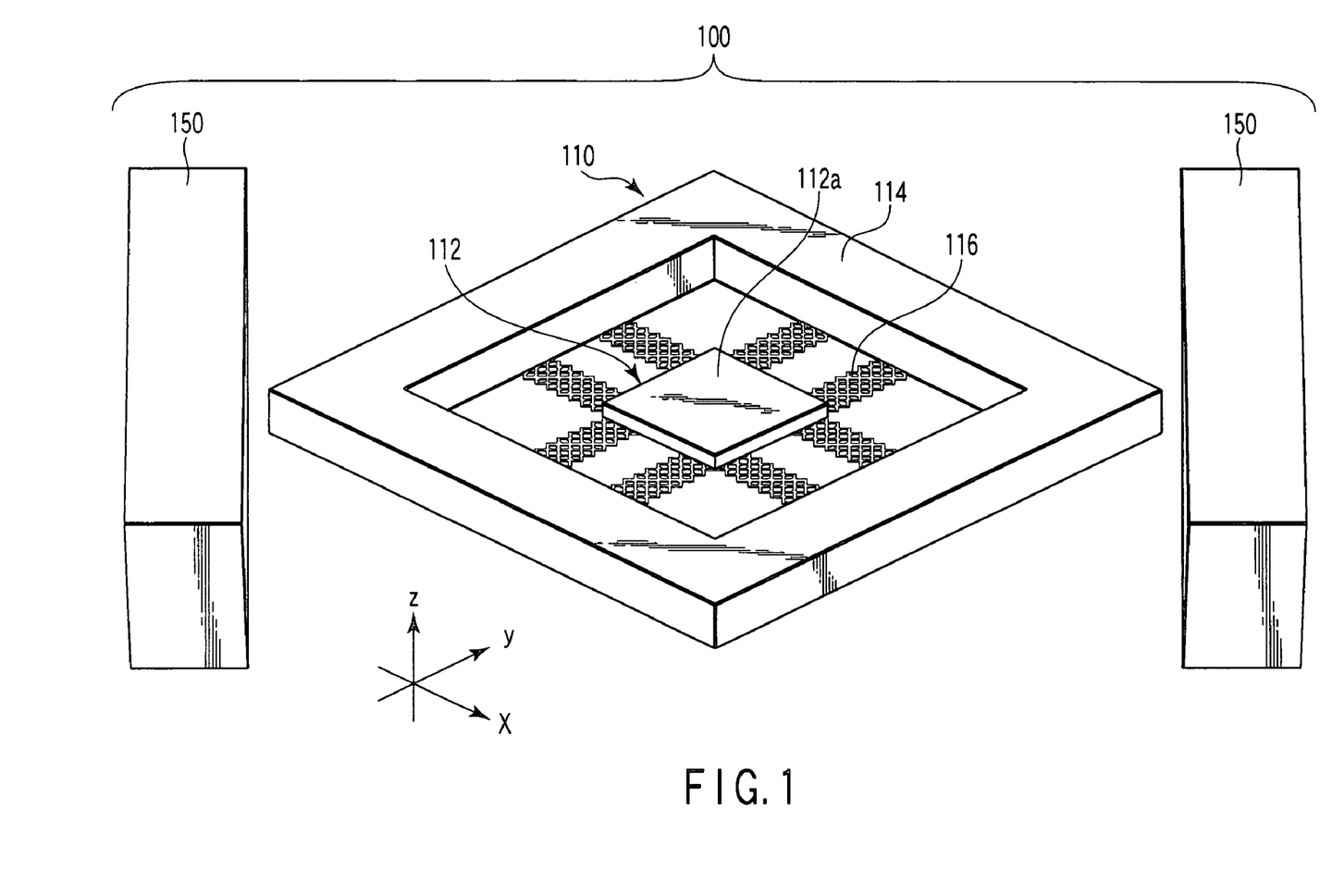
FIG. 1 is a perspective view showing an electromagnetic drive type actuator according to a first embodiment of the present invention.

FIG. 1 is a perspective view showing an electromagnetic drive type actuator according to a first embodiment of the present invention.

As shown in FIG. 1, an electromagnetic drive type actuator 100 comprises a movable plate element 110, which includes a movable plate 112 allowed to move, and two permanent magnets 150, which are arranged on both the sides of the movable plate element 110.

The movable plate element 110 has the movable plate 112, a support or support frame 114 positioned around the movable plate 112, and eight springs 116, which are elastically deformable, connecting the movable plate 112 with the support frame 114.

The movable plate element 110 is manufactured by a micromachine manufacturing method. The support frame 114 and the movable plate 112 are formed by etching a silicon substrate. Each spring 116 is mainly formed of a polyimide film.

The movable plate 112 has a rectangular flat plate conformation, and has a flat surface 112a. The flat surface 112a of the movable plate 112 is optically utilized, for example, as a reflection surface. In such a case, a thin film of metal, such as aluminum or gold, having a high reflectance with respect to light is preferably formed on the flat surface 112a of the movable plate 112. In another example, an optical element, such as a light source or an imaging element, is mounted on the flat surface 112a of the movable plate 112.

An xyz coordinate system is set in the following description as shown in FIG. 1 for the sake of convenience. That is, the xyz coordinate system is set in such a manner that an xy plane is parallel to the flat surface 112a of the movable plate 112.

The eight springs 116 constitute an elastic member that connects the movable plate 112 with the support and is elastically deformable. That is, the elastic member comprises the four springs 116 extending along the axis x and the four springs 116 extending along the axis y. These springs 116 support the movable plate 112 so as to allow the movable plate 112 to move in directions vertical to the flat surface 112a of the movable plate 112. That is, the springs 116 support the movable plate 112 so as to allow the movable plate 112 to move along as axis z.

Two permanent magnets 150 are arranged with a movable plate element 110 between them in directions substantially parallel to the flat surface 112a of a movable plate 112. These two permanent magnets 150 constitute magnetic field generating means or magnetic field generator that generates a magnetic field in a space around the movable plate 112. The magnetic generating means or magnetic field generator is not restricted to permanent magnets. The magnetic field generating means or magnetic field generator may comprise electromagnets.

Figure 3:
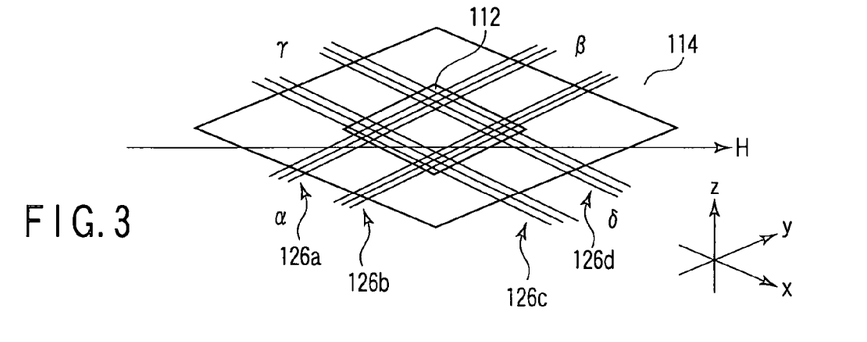
FIG. 3 schematically shows a wiring pattern of the electromagnetic drive type actuator depicted in FIG. 1 and a magnetic field.

As shown in FIG. 3, the two permanent magnets 150 generate a magnetic field H parallel to the flat surface 112a of the movable plate 112, i.e., the xy plane. In more detail, they generate the magnetic field H having a direction of 45° with respect to the axis x and axis y.

As schematically shown in FIG. 3, the movable plate element 110 further has four wiring groups 126a, 126b, 126c and 126d. The wiring groups 126a to 126d extend through the support frame 114, the movable plate 112 and the springs 116. That is, the wiring groups 126a to 126d constitute wirings, which carry currents, extending extend through the support (support frame 114), the movable plate 112 and the elastic member (springs 116).

The two wiring groups 126a and 126b extend along the axis y, and the two wiring groups 126b and 126d extend along the axis x. Therefore, the four wiring groups 126a to 126d all extend at an angle of 45° with respect to the magnetic field H. Although not shown, the wiring groups 126a and 126b are insulated from the wiring groups 126c and 126d through an insulating layer interposed between them.

Figure 2:
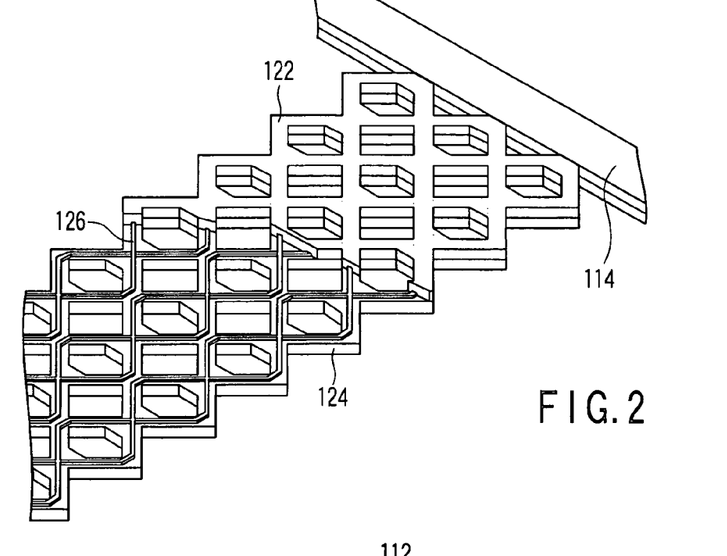
FIG. 2 is a perspective view showing a spring depicted in FIG. 1 in an enlarged manner.

As shown in FIG. 2, each spring 116 has a mesh structure. The spring 116 has two laminated polyimide thin films 122 and 124 and a wiring 126 positioned between these thin films. The characteristics of the spring 116 are mainly determined by the polyimide thin films 122 and 124.

A material of the spring may be selected from various kinds of materials, e.g., an organic insulator such as a fluorocarbon resin (brand name: Cytop manufactured by Asahi Glass Company) or a benzocyclobutene resin (brand name: Cyclotene resin manufactured by Dow Chemical), an inorganic insulator such as a silicon nitride film, a semiconductor material such as silicon, a metal thin film and others in accordance with a desired spring strength.

Each wiring 126 is an element constituting the wiring groups 126a to 126d. Although not shown, the wiring 126 is electrically connected with a pad provided to the support frame 114, and a current is supplied to the wiring 126 from a drive circuit set outside through the pad.

An electromagnetic drive type actuator 100 is driven by, e.g., causing currents having the same intensity to flow through the wiring group 126a and wiring group 126b shown in FIG. 3 in the same direction. For example, when currents are caused to flow through the wiring group 126a and wiring group 126b in a direction from α to β, i.e., a direction of +y, both the currents flowing through the wiring group 126a and wiring group 126b generate Lorentz forces having the same intensity in a downward direction, i.e., a direction of −z by the mutual effect with the magnetic field H. Therefore, the movable plate 112 moves in the downward direction, i.e., the direction of −z upon receiving the downward Lorentz forces, and stands still at a position where it balances with the resilience of springs 116.

On the contrary, when currents are caused to flow through the wiring group 126a and wiring group 126b in a direction from β to α, i.e., a direction of −y, the movable plate 112 moves in an upward direction, i.e., a direction of +z upon receiving the upward Lorentz forces, and stands still at a position where it balances with the resilience of the springs 116. That is, the movable plate 112 is displaced upwards.

The magnetic field H is generated by using the permanent magnet 150, so that its direction and intensity are fixed. Therefore, a direction of the Lorentz force received by the movable plate 112 is determined by the directions of the currents flowing through the wiring group 126a and wiring group 126b. Further, the intensity of the Lorentz force received by the movable plate 112 is determined by intensities of the currents flowing through the wiring group 126a and wiring group 126b.

Therefore, a direction of displacement of the movable plate 112 can be controlled by controlling the directions of the currents flowing through the wiring group 126a and wiring group 126b, and a magnitude of displacement of the movable plate 112 can be controlled by controlling the intensities of the currents flowing through the wiring group 126a and wiring group 126b.

That is, the movable plate 112 can be displaced by a desired distance upwards and downwards, i.e., along the axis z by controlling directions and intensities of the currents caused to flow through the wiring group 126a and wirings group 126b.

Moreover, when an undesired inclination of the movable plate 112 is generated due to irregularities in characteristics of the springs 116, unevenness of the magnetic field H, etc., the undesired inclination of the movable plate 112 can be eliminated by changing the intensities of the currents respectively flowing through the wiring group 126a and wirings group 126b. As a result, the movable plate 112 can be displaced by a desired distance upwards and downwards, i.e., along the axis z while maintaining a direction of the flat surface 112a of the movable plate 112 to a fixed direction parallel to the axis z.

Additionally, the movable plate 112 can be displaced by a desired distance upwards and downwards, i.e., along the axis z while maintaining the direction of the flat surface 112a of the movable plate 112 to a fixed direction inclined with respect to the axis z by causing currents having different intensities to flow through the wiring group 126a and wiring group 126b in the same direction from the beginning and changing the intensities of the currents flowing through the wiring group 126a and wiring group 126b in association with each other.

As described above, the magnetic field generating means or magnetic field generator may comprise an electromagnet. When the magnetic field generating means or magnetic field generator comprises an electromagnet, a direction and an intensity of a magnetic field to be generated can be changed by varying a direction and an intensity of a current caused to flow through the electromagnet. Therefore, the movable plate 112 can be displaced by a desired distance vertically, i.e., along the axis z by passing fixed currents to the wiring group 126a and wiring group 126b and changing a direction and an intensity of a current caused to flow through the electromagnet.

In this manner, when the movable plate 112 is moved by using the currents flowing through the wiring group 126a and wiring group 126b, the wiring group 126c and wiring group 126d through which no current flows do not contribute to the movement of the movable plate 112, but the springs 116 including the wiring group 126c and wiring group 126d serve to assist maintaining the direction of the flat surface 112a of the movable plate 112 constant.

Although the above has described the example that the movable plate 112 is displaced by causing the currents having the same intensities to flow through the wiring group 126a and wiring group 126b, the movable plate 112 can be likewise displaced by causing currents having the same intensity to flow through the wiring group 126c and wiring group 126d.

Further, the electromagnetic drive type actuator 100 may be driven by causing the currents having the same intensity to flow through the wiring group 126c and wiring group 126d in the same direction as well as by causing the currents having the same intensity to flow through the wiring group 126a and wiring group 126b in the same direction.

Figure 4:
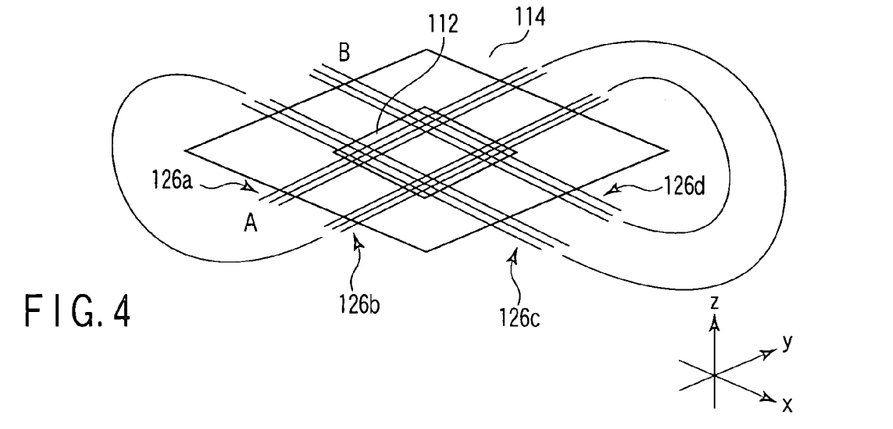
FIG. 4 shows a connection pattern for causing the same current to flow through four wiring groups show in FIG. 3.

For example, four wiring groups 126a to 126b are electrically connected with each other as show in FIG. 4, and a current is caused to flow between an end portion A of the wiring group 126a and an end portion B of the wiring group 126d. In this case, a circuit configuration used to pass the current to the wiring groups 126a to 126d is simplified.

However, preferably, it is sufficient to change the intensity of the current caused to flow through the four wiring groups 126a to 126d in order to eliminate an undesired inclination of the movable plate 112 as described above or intentionally incline the movable plate 112.

The technique of driving by causing the current to flow through all of the four wiring groups 126a to 126d can largely displace the movable plate 112 as compared with the technique of driving by causing the currents having the same intensity to flow through the two parallel wiring groups.

Since the electromagnetic drive mode is adopted for the electromagnetic drive actuator according to this embodiment, a relationship between a displacement quantity of the movable plate and a drive current has good linearity. Therefore, the displacement quantity can be also controlled by a simple drive method or signal processing. Since the electrostatic drive mode is not adopted, the sticking phenomenon does not naturally occur. Thus, an undesired reduction in drive efficiency is not provoked when the movable plate is largely displaced.

Various modifications or changes may be made to respective elements according to this embodiment.

Figure 5:
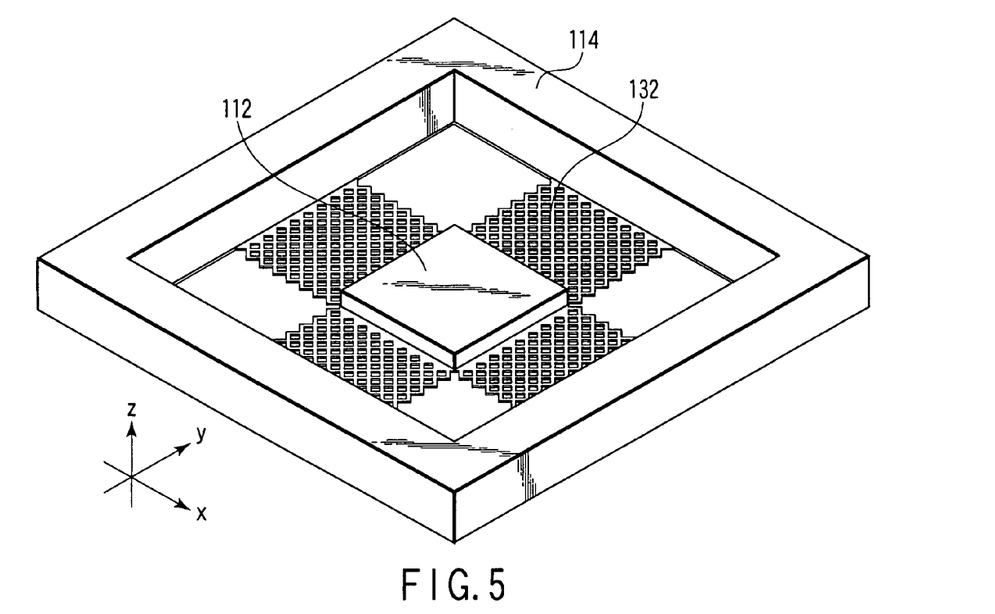
FIG. 5 shows a modification of a movable plate element, which can substitute for a movable plate element depicted in FIG. 1.
Figure 6:
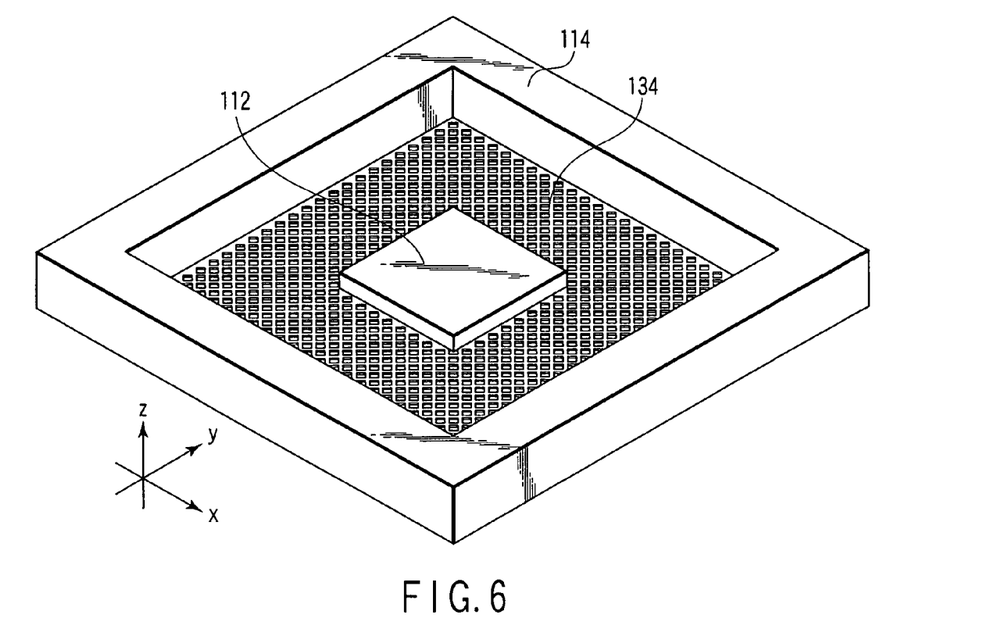
FIG. 6 shows another modification of the movable plate element, which can substrate for the movable plate element depicted in FIG. 1.

For example, in the movable plate element 110 shown in FIG. 1, although the elastic member connecting the movable plate 112 with the support (support frame 114) comprises a total of eight springs 116, i.e., the four springs 116 extending along the axis x and the four springs 116 extending along the axis y, it may comprise a total of four springs 132, i.e., two wide springs 132 extending along the axis x and two wide springs 132 extending along the axis y as shown in FIG. 5. Additionally, the elastic member may comprise a single spring 134 spread in an entire space between the movable plate 112 and the support frame 114 as shown in FIG. 6. The springs 132 and the spring 134 having such conformations are effective to compensate the spring strength when the spring strength of the springs 116 having the conformation shown in FIG. 1 is insufficient.

Figure 7:
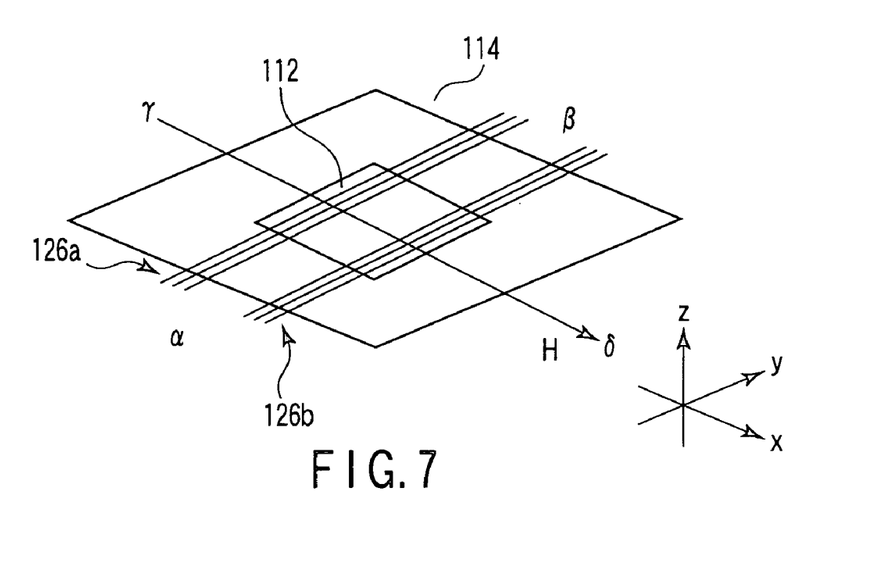
FIG. 7 shows a modification of a wiring pattern, which can substitute for the wiring pattern depicted in FIG. 3.

Further, in the electromagnetic drive type actuator 100, the wirings extending through the support (support frame 114), the movable plate 112 and elastic member (springs 116) comprise the four wiring groups 126a to 126d as shown in FIG. 3. However, the wirings may comprise only the two wiring groups 126a and 126b extending along an axis, i.e., the axis y, as shown in FIG. 7.

In this modification, the movable plate 112 can be displaced by a desired distance upwards and downwards, i.e., along the axis z by controlling directions and intensities of currents caused to flow through the wiring groups 126a and 126b like this embodiment. Furthermore, it is sufficient for the magnetic field generating means or magnetic field generator to generate a magnetic field having a direction orthogonal to the wiring groups 126a and 126b, i.e., a direction parallel to the axis x. As a result, the drive efficiency is improved to be $2^{1/2}$-times.

In this modification, since the spring extending along the axis x does not include the wirings, it is softer than the spring including the wirings corresponding to FIG. 3. Thus, the movable plate 112 can be largely displaced by using the current having the same intensity. Furthermore, the spring extending along the axis x may be eliminated. That is, the elastic member connecting the movable plate 112 with the support frame 114 may comprise a plurality of springs extending along an axis, i.e., the axis y.

Figure 8:
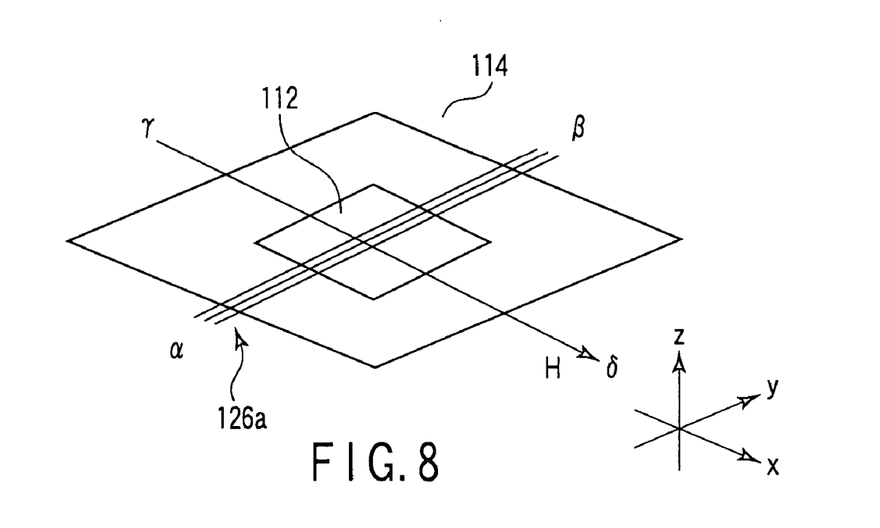
FIG. 8 shows another modification of the wiring pattern, which can substitute for the wiring pattern depicted in FIG. 3.

Moreover, as shown in FIG. 8, the wirings may comprise only one wiring group 126a extending along one axis, i.e., the axis y. In accordance with this, the elastic member of the movable plate element 110 comprises the springs having the conformation shown in FIG. 5 or FIG. 6.

Also in this modification, the movable plate 112 can be likewise displaced by a desired distance upwards and downwards, i.e., along the axis z by controlling a direction and an intensity of a current caused to flow through the wiring group 126a. Moreover, it is sufficient for the magnetic field generating means or magnetic field generator to generate a magnetic field having a direction orthogonal to the wiring groups 126a and 126b, i.e., a direction parallel to the axis x. As a result, the drive efficiency is improved to be 2-times.

In this modification, since the spring extending along the axis x does not include the wirings, it is softer than the spring including the wirings corresponding to FIG. 3. Thus, the movable plate 112 can be largely displaced by using the current having the same intensity. Additionally, the spring extending along the axis x may be eliminated. That is, the elastic member connecting the movable plate 112 with the support frame 114 may comprise a plurality of springs extending along an axis, i.e., the axis y.

The electromagnetic drive type actuator according to this embodiment may be driven by using direct-current electricity (i.e., in a DC mode) or driven by using alternating current (i.e., in an AC mode). In particular, when the actuator is driven in the AC mode, it is sufficient to match a vertical resonance mode of the springs corresponding with a vertical operating frequency of the movable plate based on a spring material or a spring dimension. As a result, it is possible to realize an improvement in drive efficiency, in other words, a reduction in power consumption.

Second Embodiment

Figure 9:
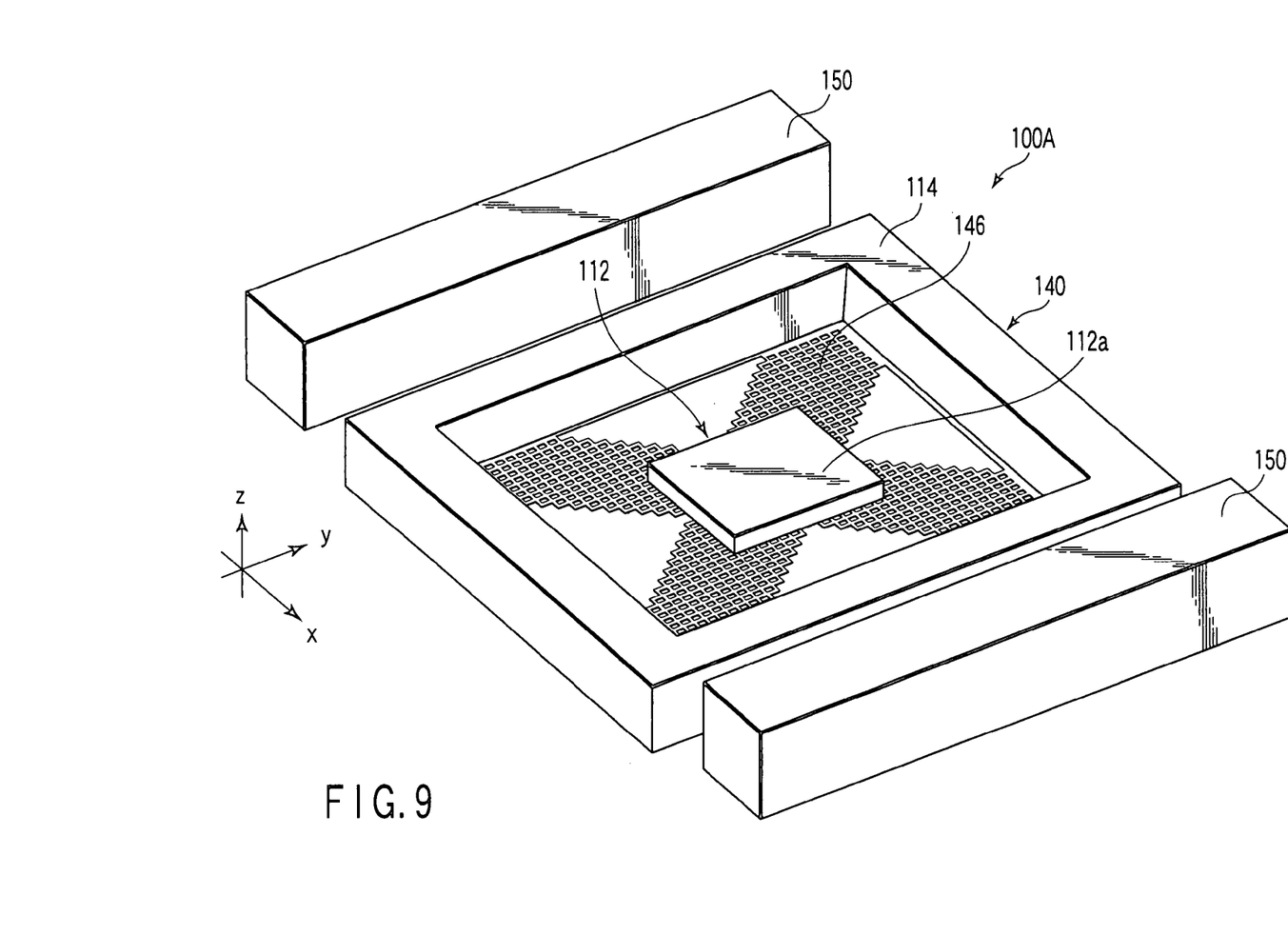
FIG. 9 is a perspective view showing an electromagnetic drive type actuator according to a second embodiment of the present invention.

FIG. 9 is a perspective view showing an electromagnetic drive type actuator according to the second embodiment of the present invention. In FIG. 9, like reference numerals denote parts equal to those in FIG. 1, thereby eliminating their detailed explanation.

As shown in FIG. 9, an electromagnetic drive type actuator 100A comprises a movable plate element 140, which includes a movable plate 112 allowed to move, and two permanent magnets 150, which are arranged on both the sides of the movable plate element 140.

The movable plate element 140 has the movable plate 112, a support frame 114 positioned around the movable plate 112, and four springs 146, which are elastically deformable, connecting the movable plate 112 with the support frame 114.

The four springs 146 constitute an elastically deformable elastic member connecting the movable plate 112 with a support (support frame 114). The elastic member comprises two springs 146 extending along an axis not parallel to the axis x and two springs 146 extending along another axis not parallel to the axis x. More particularly, the elastic member comprises the two springs 146 extending in a direction forming an angle of +45° with respect to the axis x and the two springs 146 extending in a direction forming an angle of −45° with respect to the axis x.

These springs 146 support the movable plate 112 so as to allow the movable plate 112 to move in directions parallel to a flat surface 112a of the movable plate 112. That is, the springs 146 support the movable plate 112 so as to allow the movable plate 112 to move along the axis z.

Figure 10:
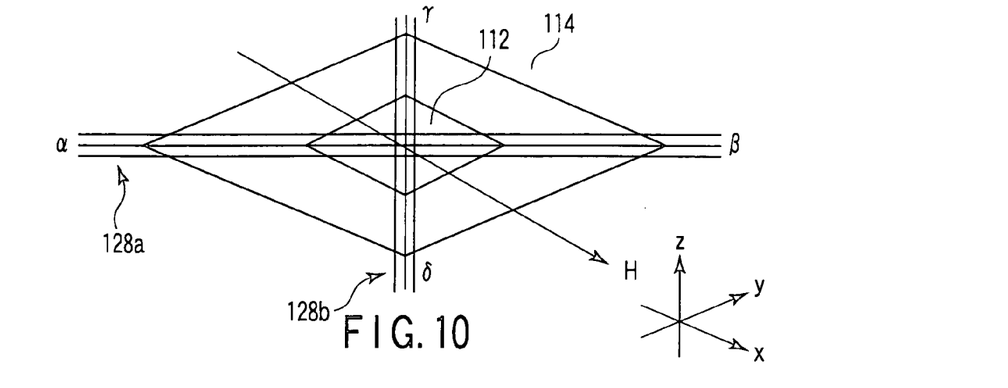
FIG. 10 schematically shows a wiring pattern of the electromagnetic drive type actuator depicted in FIG. 9 and a magnetic field.

The two permanent magnets 150 are arranged via an interval along the axis x, and generate a magnetic field H having a direction parallel to the axis x, as shown in FIG. 10.

As schematically shown in FIG. 10, the movable plate element 140 further has two wiring groups 128a and 128b. The wiring groups 128a and 128b extend through the support frame 114, the movable plate 112 and the springs 146. That is, the wiring groups 128a and 128b constitute wirings, which carry currents, extending through the support (support frame 114), movable plate 112, and elastic member (springs 146).

The two wiring groups 128a and 128b extend along diagonal lines of the movable plate 112. More particularly, the wiring group 128a extends in a direction forming an angle of −45° with respect to the axis x, and the wiring group 128b extends in a direction forming an angle of +45° with respect to the axis x. Therefore, the wiring groups 128a and 128b both extend at an angle of 45° with respect to the magnetic field H.

An electromagnetic drive type actuator 100A is driven by, e.g., causing a current to flow through a wiring group 128a. For example, when a current is caused to flow through the wiring group 128a in a direction from α to β, a movable plate 112 moves downwards, i.e., in a direction of −z upon receiving a downward Lorentz force, and stands still at a position where it balances with the resilience of springs 146. That is, the movable plate 112 is displaced downwards.

On the contrary, when a current is caused to flow through the wiring group 128a in a direction from β to α, the movable plate 112 moves upwards, i.e., in a direction of +z upon receiving the upward Lorentz force, and stands still at a position where it balances with the resilience of the springs 146. That is, the movable plate 112 is displaced upwards.

A direction and an intensity of the Lorentz force received by the movable plate 112 are determined by a direction and an intensity of the current flowing through the wiring group 128a for the same reason as that in the first embodiment. Therefore, the movable plate 112 can be displaced by a desired distance upwards and downwards, i.e., along the axis z while maintaining a direction of the flat surface 112a of the movable plate 112 to a fixed direction parallel to the axis z by controlling a direction and an intensity of the current caused to flow through the wiring group 128a.

The magnetic field generating means or magnetic field generator may comprise electromagnets in place of permanent magnets. When the magnetic field generating means or magnetic field generator comprises electromagnets, a direction and an intensity of a magnetic field to be generated can be changed by varying directions and intensities of currents caused to flow through the electromagnets. Therefore, the movable plate 112 can be displaced by a desired distance upwards and downwards, i.e., along the axis z by causing a fixed current to flow through the wiring group 128a and varying directions and intensities of currents caused to flow through the electromagnets.

The springs 146 including the wiring group 128b through which no current flows serve to assist maintaining a direction of the flat surface 112a of the movable plate 112 constant when the movable plate 112 is moved by using the current flowing through the wiring group 128a in this manner.

Although the above has described the example that the movable plate 112 is displaced by causing the current to flow through the wiring group 128a, the movable plate 112 can be likewise displaced by causing the current to flow through the wiring group 128b.

Additionally, the electromagnetic drive type actuator 100A may be driven by causing currents to flow through both the wiring group 128a and wiring group 128b. At this time, the currents are of course caused to flow in a direction that a direction of the Lorentz force received by the current flowing through the wiring group 128 matches with a direction of the Lorentz force received by the current flowing through the wiring group 128b.

Since the electromagnetic drive mode is adopted for the electromagnetic drive actuator according to this embodiment, a relationship between a displacement quantity of the movable plate and a drive current has good linearity. Therefore, the displacement quantity can be also excellently controlled by a simple drive method or signal processing. Since the electrostatic drive mode is not adopted, a sticking phenomenon does not naturally occur. Therefore, an undesired reduction in drive efficiency is not provoked when the movable plate is largely displaced.

In this embodiment, since the wiring group 128a and wiring group 128b extend in diagonal directions of the movable plate 112, a dimension of the movable plate element becomes smaller than that in the first embodiment if the wirings in the springs have the same length.

A wide variety of modifications or changes may be carried out with respect to various elements in this embodiment.

Figure 11:
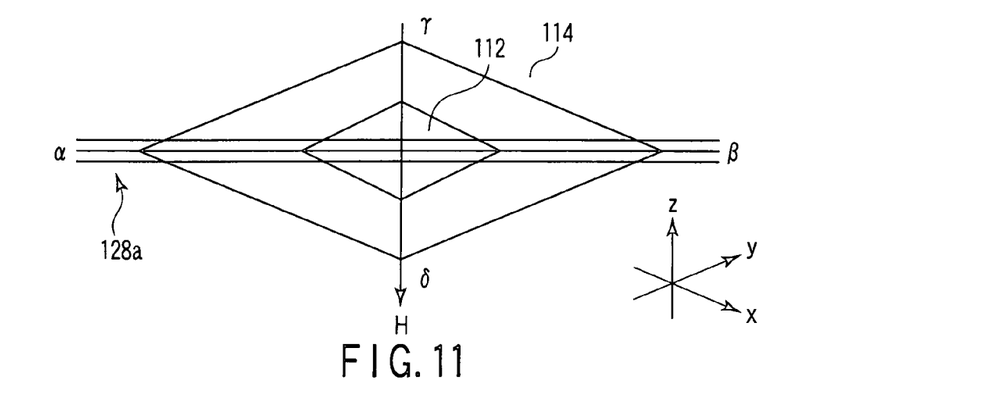
FIG. 11 shows a modification of a movable plate element, which can substitute for a movable plate element depicted in FIG. 10.

For example, wirings, which extend through the support (support frame 114), the movable plate 112 and the elastic member (springs 146) and carry currents, may comprise only one wiring group 128a extending in a direction of one axis, i.e., a direction from α to β as shown in FIG. 11.

In this modification, completely the same driving is carried out as driving by causing the current to flow through the wiring group 128a in FIG. 10. Further, it is sufficient for the magnetic field generating means or magnetic field generator to generate a magnetic field having a direction orthogonal to the wiring group 128a, i.e., a direction from γ to δ. As a result, the drive efficiency is improved to be 2-times.

In this modification, since the spring extending in the direction from γ to δ does not include the wirings, it is softer than the springs including the wirings corresponding to FIG. 10. Accordingly, the movable plate 112 can be largely displaced by using a current having the same intensity. Furthermore, the spring extending extends from the direction from γ to δ may be eliminated. That is, the elastic member, which connects the movable plate 112 with the support frame 114, may comprise two springs extending along an axis or in the direction from α to β.

The electromagnetic drive type actuator according to this embodiment may be driven by using direct-current electricity (i.e., in a DC mode) or by using alternating current (i.e., in an AC mode). When driven in the AC mode in particular, it is sufficient to match a vertical resonance mode of the springs corresponding with a vertical operating frequency of the movable plate based on a spring material or a spring dimension. As a result, it is possible to realize an improvement in drive efficiency, in other words, a reduction in power consumption.

Third Embodiment

Figure 12:
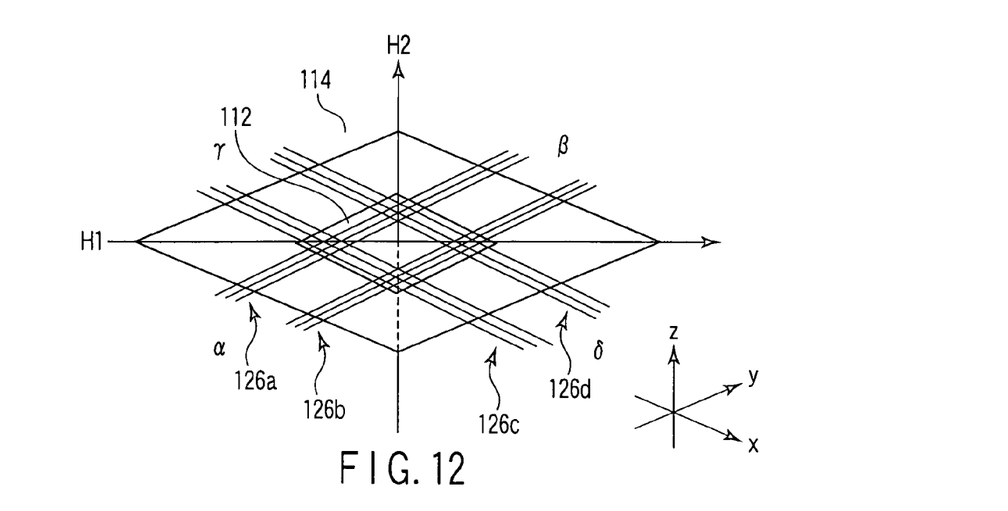
FIG. 12 schematically shows a wiring pattern of an electromagnetic drive type actuator according to a third embodiment of the present invention and magnetic fields.

FIG. 12 schematically shows a relationship between wirings and magnetic fields in an electromagnetic drive type actuator according to a third embodiment of the present invention. The electromagnetic drive type actuator according to this embodiment is different from the electromagnetic drive type actuator according to the first embodiment in a structure of the magnetic generating means or magnetic field generator.

The electromagnetic drive type actuator according to this embodiment comprises a movable plate element, which is described in the first embodiment, and magnetic field generating means or a magnetic field generator including two electromagnets. As shown in FIG. 12, one electromagnet generates a magnetic field H1 having a direction parallel to the xy plane, and the other electromagnet generates a magnetic field H2 having a direction parallel to the axis z.

Of course, the directions of the magnetic field H1 and the magnetic field H2 can be changed by varying the directions of the currents caused to flow through the electromagnets that generate these magnetic fields.

In the electromagnetic drive type actuator according to this embodiment, with the magnetic field H1 being generated by the electromagnet, the movable plate 112 can be displaced by a desired distance upwards and downwards, i.e., along the axis z by, e.g., causing currents having the same intensity to flow through the wiring group 126a and wiring group 126b in the same direction, as in the first embodiment.

Furthermore, in the electromagnetic drive type actuator according to this embodiment, with the magnetic field H2 being generated by the electromagnet, the movable plate 112 can be displaced in parallel to the xy plane by causing currents to appropriately flow through any of the four wiring groups 126a to 126d in the same direction.

For example, when the currents are caused to flow through the wiring group 126a and wiring group 126b in a direction from α to β, i.e., a direction of +y with the magnetic field H2 being generated, both the currents flowing through the wiring group 126a and wiring group 126b generate the Lorentz force in the direction of +x by the mutual effect with the magnetic field H2. Therefore, the movable plate 112 moves in the direction of +x upon receiving the Lorentz force in the direction of +x, and stands still at a position where it balances with the resilience of springs 116. That is, the movable plate 112 is displaced in the direction of +x.

On the contrary, when the currents are caused to flow through the wiring group 126a and wiring group 126b in a direction from β to α, i.e., a direction of −y, the movable plate 112 moves in a direction of −x upon receiving the Lorentz force in the direction of −x, and stands still at a position where it balances with the resilience of the springs 116. That is, the movable plate 112 is displaced in the direction of −x.

A direction of the Lorentz force received by the movable plate 112 is determined by directions of the currents flowing through the wiring group 126a and wiring group 126b. Moreover, an intensity of the Lorentz force received by the movable plate 112 is determined by intensities of the currents flowing through the wiring group 126a and wiring group 126b. Therefore, the movable plate 112 can be displaced by a desired distance along the axis x by controlling directions and intensities of the currents caused to flow through the wiring group 126a and wiring group 126b.

Additionally, when the currents are caused to flow through the wiring group 126c and wiring group 126d with the magnetic field H2 being generated, the movable plate 112 moves along the axis y upon receiving the Lorentz force in a direction parallel to the axis y and stands still at a position where it balances with the resilience of the springs 116 for the same reason. That is, the movable plate 112 is displaced along the axis y. A direction and an intensity of the Lorentz force received by the movable plate 112 are determined by directions and intensities of the currents flowing through the wiring group 126c and wiring group 126d. Therefore, the movable plate 112 can be displaced by a desired distance along the axis y by controlling directions and intensities of the currents caused to flow through the wiring group 126c and wiring group 126d.

After all, in the electromagnetic drive type actuator according to this embodiment, the movable plate 112 can be displaced by a desired distance in parallel to the xy plane by causing the currents to flow through one or more appropriate wiring groups in the four wiring groups 126a to 126d while controlling directions and intensities of the currents with the magnetic field H2 being generated by using the electromagnet.

In the present embodiment, the movable plate 112 can be translated in the directions orthogonal to the flat surface 112a or the directions parallel to the same. In other words, the movable plate 112 can be translated at least one of: (1) in the directions orthogonal to the flat surface 112a; and (2) in the directions parallel to the same.

Further, in the electromagnetic drive type actuator according to this embodiment, the movable plate 112 can be displaced by a desired distance in an arbitrary direction by causing the currents to flow through the appropriate wiring groups 126a to 126d while controlling directions and intensities of the currents with both the magnetic field H1 and the magnetic field H2 being generated by using the electromagnets.

Since the electromagnetic drive mode is adopted for the electromagnetic drive actuator according to this embodiment, a relationship between a displacement quantity of the movable plate and a drive current has good linearity. Therefore, the displacement quantity can be also excellently controlled by a simple drive method or signal processing. Since the electrostatic drive mode is not adopted, the sticking phenomenon does not of course occur. Therefore, an undesired reduction in drive efficiency is not provoked when the movable plate is largely displaced.

The electromagnetic drive type actuator according to this embodiment may be driven by using direct-current electricity (i.e., in a DC mode) or by using alternating current (i.e., an AC mode). When driven in the AC mode in particular, it is sufficient to match resonance modes of an upward and downward movement or a translational movement or the both of springs corresponding with an operating frequency of an upward and downward movement or a translational movement (movement in a direction parallel to the flat surface of the movable plate) or the both of the movable plate by using the setting of a spring material or a spring dimension. As a result, it is possible to realize an improvement in drive efficiency, in other words, a reduction in power consumption.

Application Example to Video Cameras

The electromagnetic drive type actuators according to the first to third embodiments can be applied to various intended uses. For example, it is possible to configure, e.g., a new focusing mechanism, e.g., for a video camera, that displaces an imaging element in directions vertical to an imaging plane by mounting the imaging element on the movable plate 112. Furthermore, the electromagnetic drive type actuator according to this embodiment can be applied to a speaker or a microphone with the movable plate being regarded as a diaphragm.

A description will now be given as to an application of the electromagnetic drive type actuators according to the first to third embodiments to a video camera. The following will describe an application example of a piezoelectric actuator disclosed in Jpn. Pat. Appln. KOKAI Publication No. 5-48957 as a prior art to a video camera before explaining the application of the electromagnetic drive type actuators according to the first to third embodiments to the video camera.

Figure 13:
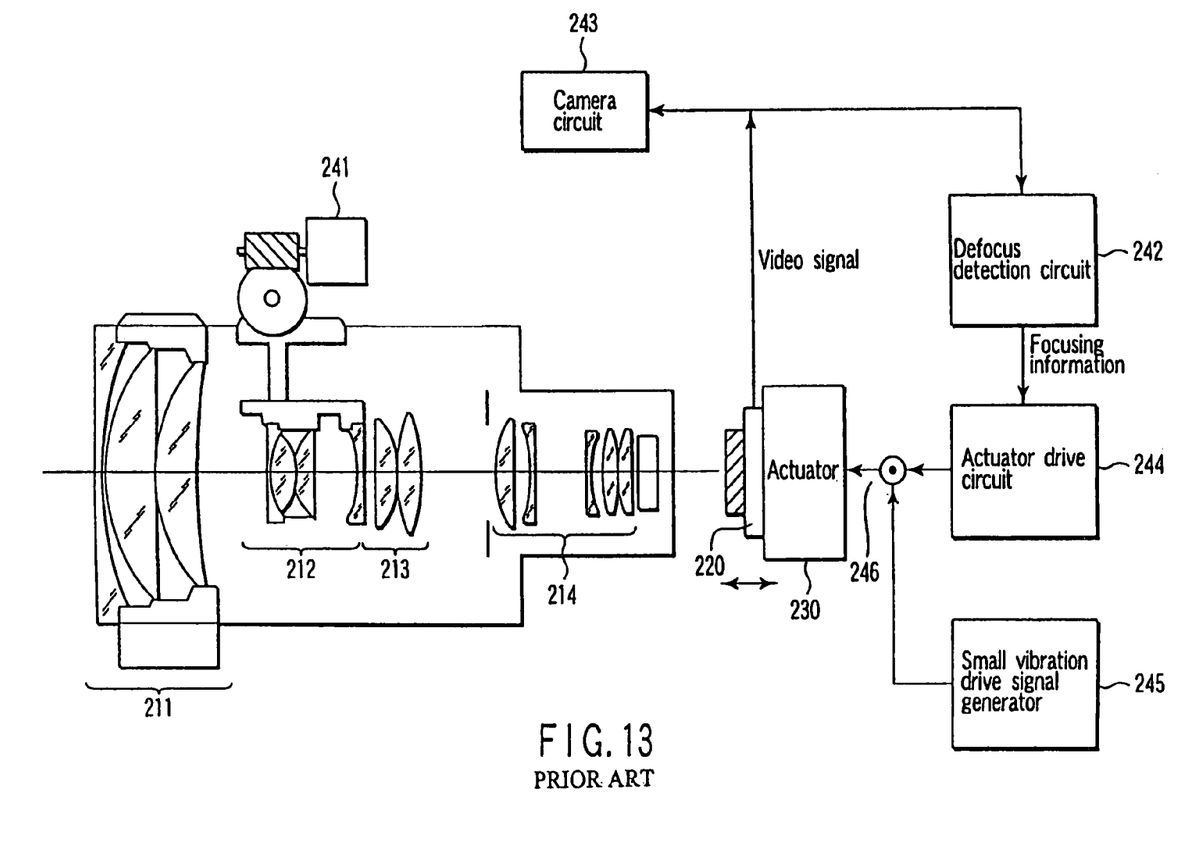
FIG. 13 schematically shows a structure of a video camera according to a prior art.

FIG. 13 schematically shows a structure of a video camera according to the prior art. A lens system of this video camera has a four-group lens structure including a focusing lens 211, a zoom lens 212, a focal position correction lens 213 and a relay lens (or an image forming system lens) 214 arranged in the order from an object side. An optical image obtained through these lenses 211 to 214 is image-formed on an imaging element 220 such as a CCD. In this video camera, focusing is achieved by moving the imaging element 220 along an optical axis by using a piezoelectric actuator 230. The piezoelectric actuator 230 is controlled in accordance with a drive signal fed from an actuator drive circuit 244.

Figure 14A:
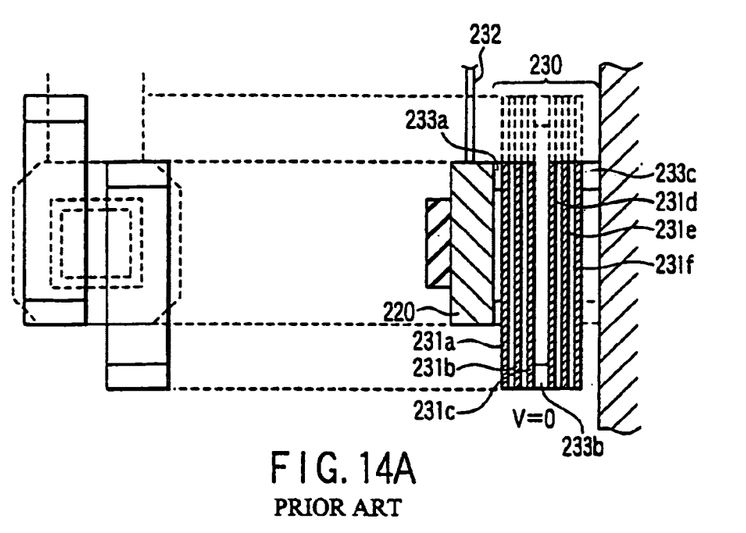
FIGS. 14A, 14B and 14C concretely show a structure of a piezoelectric actuator depicted in FIG. 13.
Figure 14B:
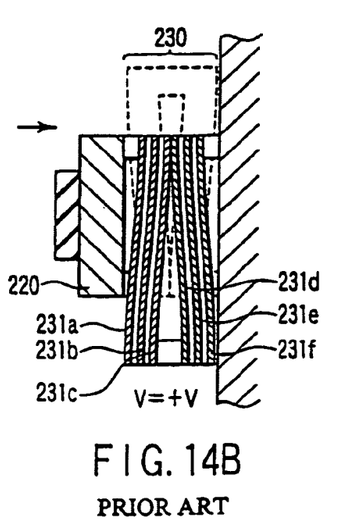
Figure 14C:
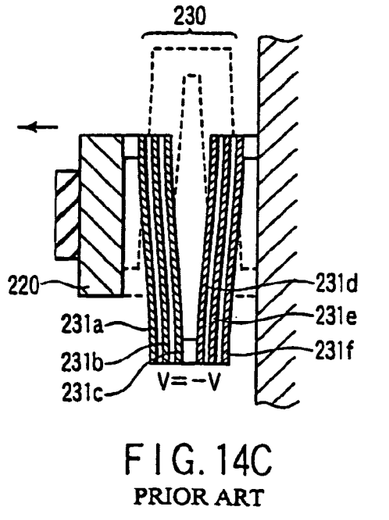

A concrete structural example of the piezoelectric actuator 230 will now be described with reference to FIGS. 14A, 14B, 14C, 15A, and 15B. As shown in FIGS. 14A, 14B, and 14C, the piezoelectric actuator 230 comprises D-drive bimorph elements 231a to 221f. The S-drive bimorphs elements drive a regular piezoelectric bimorph element in such a manner that a displacement direction has an antiphase with the center in the longitudinal direction on the border.

Figure 15A:
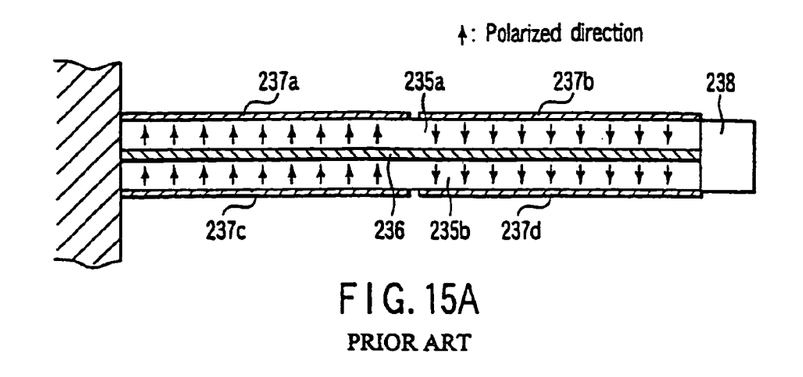
FIGS. 15A and 15B show an S-drive bimorph element included in the piezoelectric actuator depicted in FIGS. 14A, 14B and 14C.
Figure 15B:
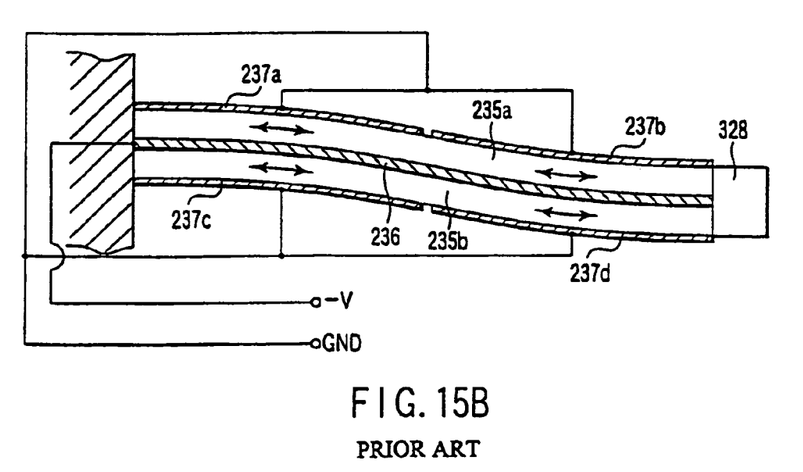
Figure 16:
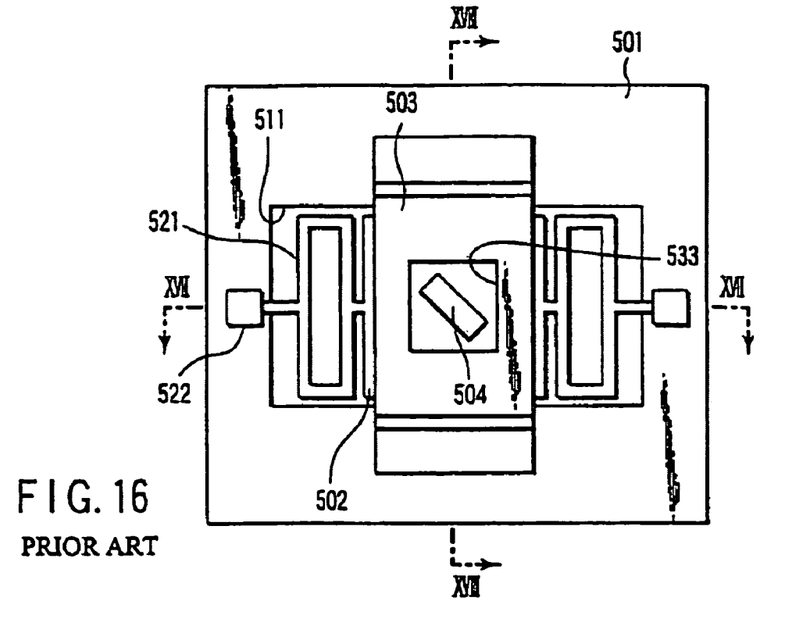
FIG. 16 is a view of an actuator according to a prior art as viewed from an upper side.

For example, as shown in FIG. 15A, the S-drive bimorph element comprises a holding electrode 236, which also functions as a shim material, two piezoelectric materials 235a and 235b sandwiching this electrode 236, and electrodes 237a to 237d provided on outer surfaces of these piezoelectric materials, and this element has a displacement fetching portion 238 at its free end. The piezoelectric materials 235a and 235b are polarized in opposite directions with the center in the longitudinal direction on the border, and the electrodes 237a to 237d are arranged in accordance with the respective polarization areas.

In the piezoelectric actuator 230 depicted in FIGS. 14A, 14B, and 14C, the three S-drive bimorph elements 231a, 231b and 231c have their both ends connected with each other, and the three S-drive bimorph elements 231d, 231e and 231f also have their both ends connected with each other. Their ends on one side are connected with each other through a bimorph fixing member 233b, and their ends on the other side are connected to a fixing member which fixes the imaging element 220 mounted on a flexible printed board 232 and a case or the like through a bimorph fixing member 233a and a bimorph fixing member 233c.

With such a structure, an increase in displacement and an improvement in mechanical properties of the structure including the three S-drive bimorph elements are achieved when used in the same conformation as that of a cantilever bimorph.

The piezoelectric actuator 230 includes two such structures, and they are alternately arranged as shown in FIG. 14. As a result, the mechanical properties are improved.

The focusing operation can be performed by setting the piezoelectric actuator 230 having such a structure on a rear surface of the imaging element 220 and driving it as shown in FIGS. 14B and 14C. FIG. 14B shows a state that a focal distance is minimum (e.g., 1 m), and FIG. 14C shows a state that the focal distance is infinitely large.

When the electromagnetic drive type actuator according to any of the first to third embodiments is arranged in place of the piezoelectric actuator 230 in the structure of the video camera shown in FIG. 13 and the imaging element 220 is mounted on the flat surface 112a of the movable plate 112, the imaging element can be moved along the optical axis in order to perform the focusing operation, as in the prior art.

Moreover, when the actuator according to the third embodiment is applied, the imaging element can be moved along not only the optical axis for the focusing operation but the imaging element can be also moved in directions orthogonal to the optical axis. Therefore, a resolution of an image can be increased. In more detail, one frame is divided into a plurality of fields, the imaging element is moved in directions orthogonal to the optical axis in accordance with each field in order to obtain image data, and one frame is constituted by combining image data of the respective fields, thereby acquiring an image with a high resolution.

Additionally, the movement of the imaging element in the direction orthogonal to the optical axis can be utilized not only for an increase in resolution but also for prevention of a hands movement when using the camera by controlling and feeding back vibrations of the camera to the actuator.

Although the above has described the embodiments according to the present invention with reference to the drawings, the present invention is not restricted to these embodiments, and various modifications or changes can be carried out without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions orthogonal to the flat surface of the movable plate;
wirings, which carry currents, extending through the support, the movable plate, and the elastic member; and
magnetic field generating means for generating a magnetic field in a space around the movable plate, the magnetic field having a direction parallel to the flat surface of the movable plate, so that the movable plate is moved in the directions orthogonal to the flat surface of the movable plate by a mutual effect between the currents flowing through the wirings and the magnetic field generated by the magnetic field generating means;
wherein the elastic member comprises parts extending in two directions, which are not parallel to each other.

2. The electromagnetic drive type actuator according to claim 1, wherein the elastic member has a mesh structure.

3. The electromagnetic drive type actuator according to claim 1, wherein the two non-parallel directions, along which the parts constituting the elastic member extend, are orthogonal to each other.

4. The electromagnetic drive type actuator according to claim 3, wherein the magnetic field has a direction of 45° with respect to the two directions, along which the parts constituting the elastic member extend and which are orthogonal to each other.

5. The electromagnetic drive type actuator according to claim 4, wherein the magnetic field generating means comprise two permanent magnets arranged on both sides of the movable plate.

6. The electromagnetic drive type actuator according to claim 4, wherein the magnetic field generating means comprise electromagnets.

7. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions orthogonal to the flat surface of the movable plate and directions parallel to the same;

wirings, which carry currents, extending through the support, the movable plate, and the elastic member; and magnetic field generating means for generating a magnetic field in a space around the movable plate, the magnetic field being one of a first magnetic field having a direction parallel to the flat surface of the movable plate and a second magnetic field having a direction orthogonal to the same, the magnetic field generating means selectively generating one of the first magnetic field and second magnetic field, so that the movable plate is moved in the directions orthogonal to the flat surface of the movable plate or the directions parallel to the same by a mutual effect between the currents flowing through the wirings and the magnetic field generated by the magnetic field generating means.

8. The electromagnetic drive type actuator according to claim 7, wherein the elastic member has a mesh structure.

9. The electromagnetic drive type actuator according to claim 7, wherein the elastic member comprises parts extending in two directions which are not parallel to each other.

10. The electromagnetic drive type actuator according to claim 9, wherein the two non-parallel directions, along which the parts constituting the elastic member extend, are orthogonal to each other.

11. The electromagnetic drive type actuator according to claim 7, wherein the elastic member comprises parts extending in a direction.

12. The electromagnetic drive type actuator according to claim 7, wherein the magnetic field generating means comprises a first electromagnet that generates a first magnetic field, as necessary, and a second electromagnet that generates a second magnetic field, as necessary.

13. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions orthogonal to the flat surface of the movable plate;
wirings, which carry currents, extending through the support, the movable plate, and the elastic member; and
a magnetic field generator, which generates a magnetic field in a space around the movable plate, the magnetic field having a direction parallel to the flat surface of the movable plate, so that the movable plate is moved in the directions orthogonal to the flat surface of the movable plate by a mutual effect between the currents flowing through the wirings and the magnetic field generated by the magnetic field generator.

14. The electromagnetic drive type actuator according to claim 13, wherein the elastic member has a mesh structure.

15. The electromagnetic drive type actuator according to claim 13, wherein the elastic member comprises parts extending in two directions, which are not parallel to each other.

16. The electromagnetic drive type actuator according to claim 15, wherein the two non-parallel directions, along which the parts constituting the elastic member extend, are orthogonal to each other.

17. The electromagnetic drive type actuator according to claim 16, wherein the magnetic field has a direction of 45° with respect to the two directions, along which the parts constituting the elastic member extend and which are orthogonal to each other.

18. The electromagnetic drive type actuator according to claim 13, wherein the elastic member comprises parts extending in a direction.

19. The electromagnetic drive type actuator according to claim 18, wherein the magnetic field has a direction orthogonal to the direction along, which the parts constituting the elastic member extend.

20. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions orthogonal to the flat surface of the movable plate and directions parallel to the same;
wirings, which carry currents, extending through the support, the movable plate, and the elastic member; and
a magnetic field generator, which generates a magnetic field in a space around the movable plate, the magnetic field being one of a first magnetic field having a direction parallel to the flat surface of the movable plate and a second magnetic field having a direction orthogonal to the same, the magnetic field generator selectively generating one of the first magnetic field and second magnetic field, so that the movable plate is moved in the directions orthogonal to the flat surface of the movable plate or the directions parallel to the same by a mutual effect between the currents flowing through the wirings and the magnetic field generated by the magnetic field generator.

21. The electromagnetic drive type actuator according to claim 20, wherein the elastic member has a mesh structure.

22. The electromagnetic drive type actuator according to claim 20, wherein the elastic member comprises parts extending in two directions, which are not parallel to each other.

23. The electromagnetic drive type actuator according to claim 22, wherein the two non-parallel directions along which the parts constituting the elastic member extend, are orthogonal to each other.

24. The electromagnetic drive type actuator according to claim 20, wherein the elastic member comprises parts extending in a direction.

* * * * *